INVENTORS
ELMER A. HAASE
THOMAS W. NOBLES
ALBERT P. SCHNAIBLE
HOWARD L. McCOMBS
BY Robert C. Smith
ATTORNEY

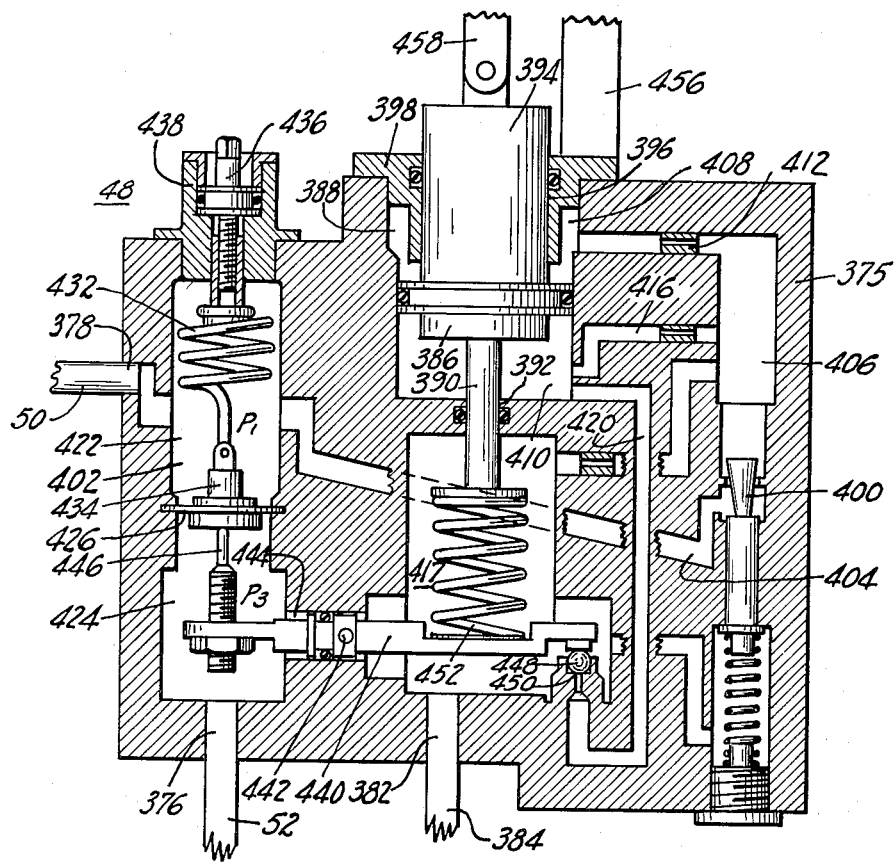
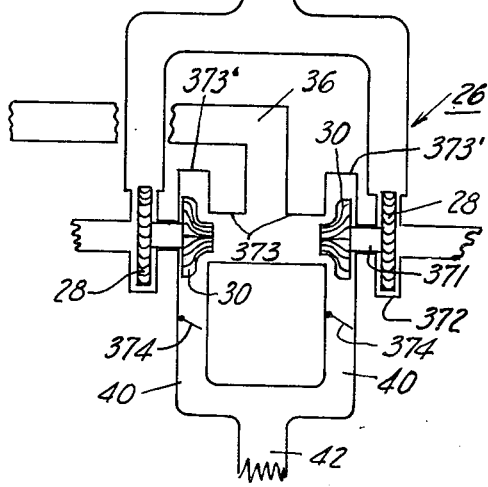

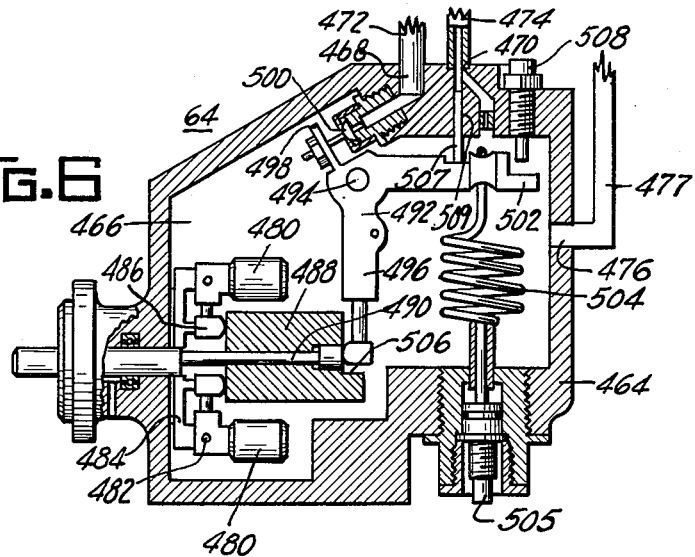
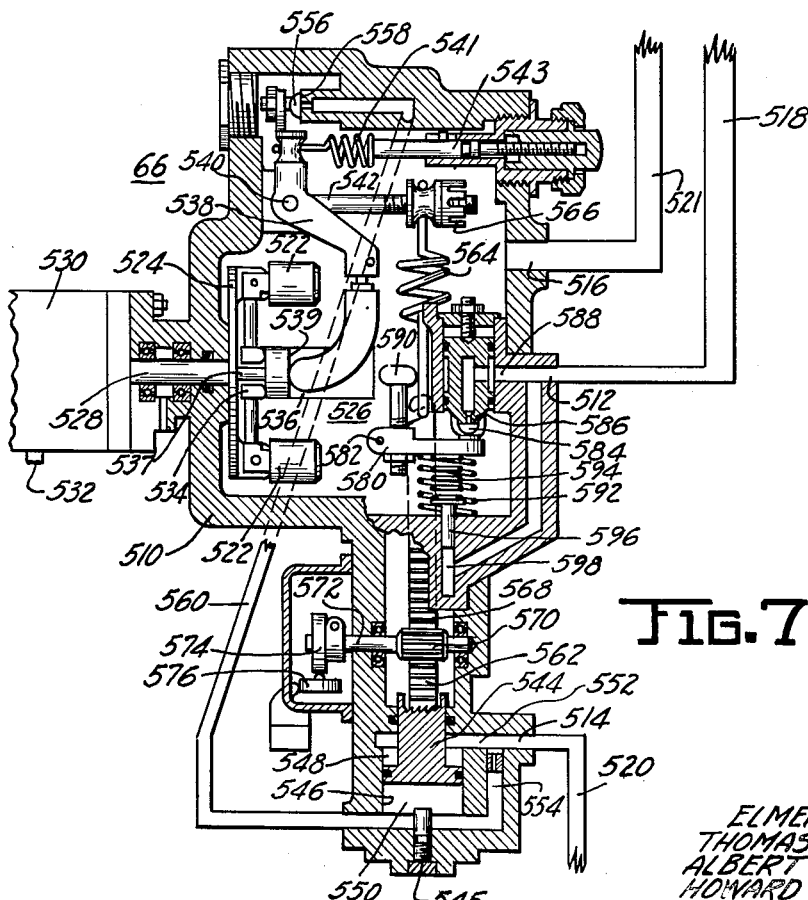

INVENTOR.
ELMER A. HAASE
THOMAS W. NOBLES
ALBERT P. SCHNAIBLE
HOWARD L. McCOMBS
BY Robert E. Smith
ATTORNEY

United States Patent Office 3,023,575
Patented Mar. 6, 1962

3,023,575
NORMAL AND EMERGENCY FUEL CONTROL SYSTEM FOR GAS TURBINE ENGINES
Elmer A. Haase, Thomas W. Nobles, Albert P. Schnaible, and Howard L. McCombs, Jr., South Bend, Ind., assignors to The Bendix Corporation, a corporation of Delaware
Filed Dec. 16, 1957, Ser. No. 703,112
26 Claims. (Cl. 60—39.28)

This invention relates to fuel feed and power control apparatus for gas turbine engines; particularly turbo-jet engines for aircraft.

A conventional turbo-jet engine usually includes an air inlet, one or more combustion chambers, one or more compressors for supplying air to the combustion chambers, one or more gas turbines driven by the products of combustion from the combustion chamber; a tailpipe for discharging exhaust gases from the turbines to the atmosphere and may incorporate a variable area nozzle for adjusting the discharge area of the tailpipe. A fuel system including a fuel pump is employed with the engine to regulate the fuel flow thereto in accordance with prescribed limits of operation of the engine. For a given flow of fuel the rotational speed of the engine as well as the temperatures and pressures within the engine will vary as a function of a wide variety of factors among which are variables such as compressor inlet temperature and pressure; flight altitude and speed. For precise control of engine speed, temperature and pressure it is necessary to provide the fuel system with component devices that sense the above mentioned variables and function to automatically correct the fuel flow in accordance with existing conditions.

In referring to the above mentioned variables of engine operation, applicants have chosen the terminology "engine control functions" to refer to these variables generically. The fuel system may include emergency fuel control means for controlling fuel flow in the event of failure or malfunction of one or more of the above mentioned component devices. Due to weight and space limitations, the common practice is to dispense with automatic regulation of fuel flow during emergency operation and to resort to a fixed fuel flow schedule which is a function of throttle lever position. During emergency operation therefore, the pilot must manually, through the throttle lever, adjust engine fuel flows for variations in air density to maintain desired engine speeds and temperatures. In the past, it has been the practice to utilize separate metering valves for regulating fuel flow to the engine under normal and emergency fuel regulation and transfer means separate from the metering valves for switching between normal and emergency operation. It has also been the practice to use a main fuel pump of the positive displacement type which has a direct drive connection with the engine and which requires either a by-pass valve or control mechanism for varying the displacement of the pump depending upon whether the pump is of the constant displacement type or of the variable displacement type. Another type of fuel pump is the air driven turbine centrifugal fuel pump which possesses advantages in weight and space requirements as well as power source requirements over the positive displacement type fuel pump. These advantages have been offset to a certain extent by the difficulties encountered in maintaining precise control over the operation of the air turbine driven pump and the use of the pump has, therefore not been extensive. A particular advantage of the air turbine driven fuel pump over that of the direct drive fuel pump stems from the ability of the air turbine to utilize air pressure bled from the compressor which action is required in the usual air compressor system to meet operating requirements of the engine. For a given flow of fuel the direct drive fuel pump places a substantial drain on engine power in excess of the air turbine driven fuel pump since the available bleed off pressure cannot be utilized to the fullest possible extent.

An object of this invention is to provide fuel feed and control apparatus employing an air turbine driven main fuel pump.

Another object of this invention is to provide improved fuel control apparatus which delivers the desired level of fuel flow under a wide variety of operating conditions.

Still another object of this invention is to provide a fuel feed and control apparatus with improved valve means for controlling fuel flow under normal or emergency conditions.

It is another object of this invention to provide a dual fuel control system which under one set of conditions operates to control fuel flow as a function of throttle lever position, compressor inlet pressure, compressor inlet temperature and engine speed and which under a different set of conditions operates to control fuel flow as a function of compressor inlet pressure and throttle lever position.

An important object of this invention is to provide a dual fuel control system and simple and reliable means for transferring from one system to the other.

Another important object of this invention is to provide a metering valve which functions to control fuel flow during normal or emergency operating conditions and which includes transfer means for switching from one condition to the other.

A further object of this invention is to provide a fuel control system including main fuel control apparatus, afterburner fuel control apparatus and an air turbine driven fuel pump for supplying fuel to both fuel controls, all of which is combined as a relatively compact and light weight until with a minimum number of fluid connections required to integrate the system.

A further object of this invention is to provide a novel means for selectively transferring from normal to emergency fuel regulation.

A still further object of this invention is to provide a fuel pump which is driven by compressor generated air pressure and which provides the main source of pressurized fuel for a fuel system associated therewith.

FIGURE 3 the upper (throttling valve section) part of said device;

FIGURE 4 is a sectional schematic view of the pump control unit of FIGURE 1;

FIGURE 5 is a sectional schematic view of the fuel pumping units of FIGURE 1;

FIGURE 6 is a sectional schematic view of the low pressure compressor speed governor of FIGURE 1;

FIGURE 7 is a sectional schematic of the high pressure compressor speed governor of FIGURE 1;

Figure 1:
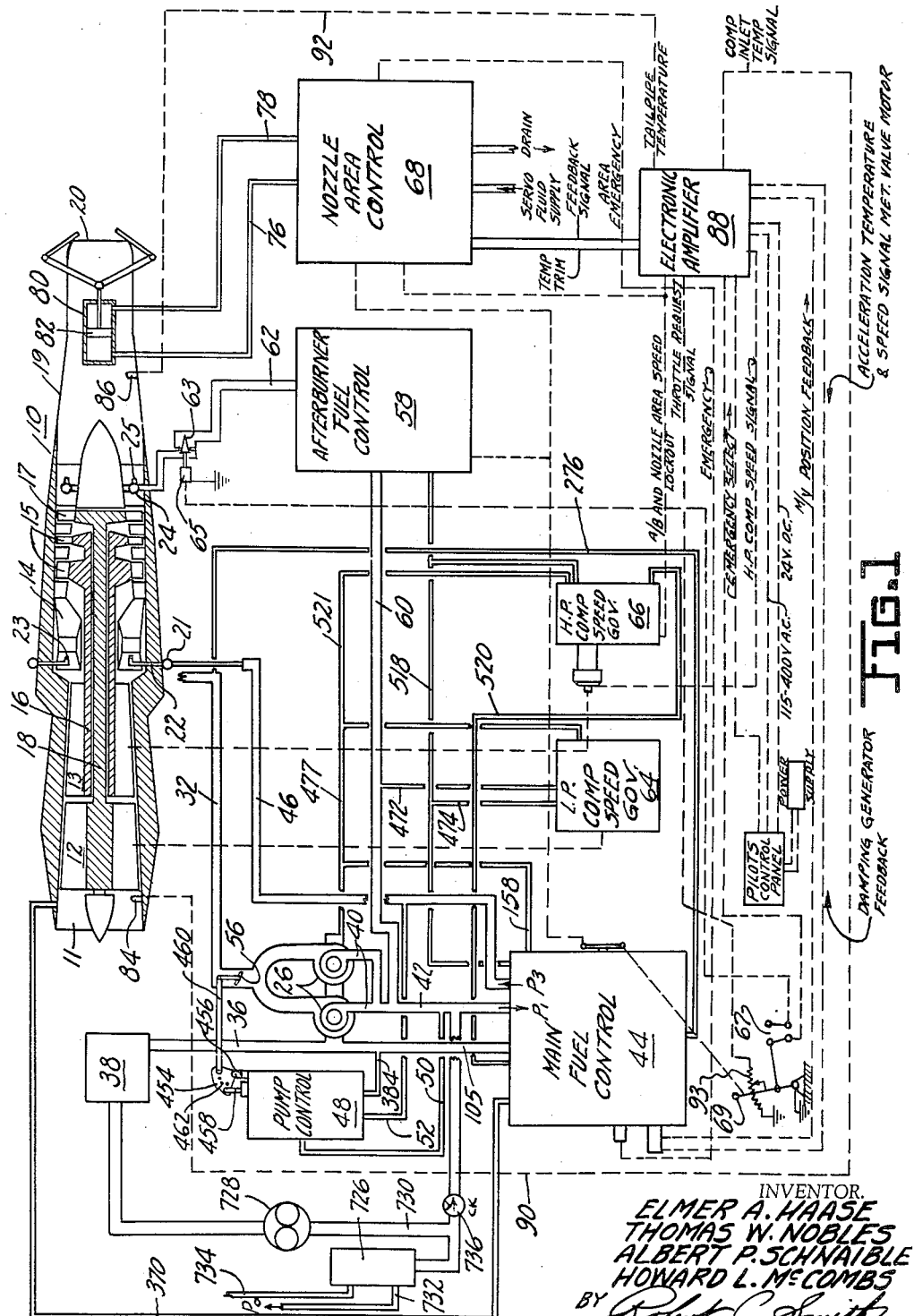
FIGURE 1 is a schematic representation of a turbo-jet engine equipped with a fuel system in which the present invention is embodied.

Referring now to FIGURE 1, numeral 10 indicates a gas turbine engine having an air intake 11, a low pressure compressor 12, a high pressure compressor 13, combustion chambers 14, turbines 15 drivably connected to the high pressure compressor 13 via a hollow shaft 16, and a turbine 17 drivably connected to the low pressure compressor 12 via a shaft 18 concentric with and extending through hollow shaft 16. The low pressure compressor 12 and turbine 17 are mounted for rotation independently of the high pressure compressor 13 and turbines 15. The exhaust gases from turbine 17 discharge into a tailpipe 19 from which the gases expand through an adjustable exhaust nozzle 20 to the atmosphere. Combustion chambers 14 are supplied fuel from a fuel manifold 21 by way of individual fuel lines 22 and nozzles 23. An afterburner fuel manifold 24 located in tailpipe 19 discharges fuel through nozzles 25 to the exhaust gases from turbine 17 to provide thrust augmentation when required.

A pair of fuel pumping units 26, each having an air driven turbine 28 and a centrifugal fuel pump 30 drivably connected together (see FIGURE 5), are connected to a bifurcated air supply passage 32 which communicates with a compressor discharge air pressure source. A conduit 36 connects a source of fuel supply 38 with the inlets of the centrifugal pumps 30. The pumps 30 are provided with separate outlet passages 40 which are in parallel flow relationship and which communicate with a conduit 42 leading to the inlet of a main fuel control 44. A discharge conduit 46 transmits a metered flow of fuel from the main fuel control 44 to the main fuel manifold 21. The operation of the fuel pumping units 26 is controlled by a pump control unit 48 which is supplied a pressure signal $P_1$—$P_3$ (pump discharge pressure—metered fuel pressure) by means of passages 50 and 52 connected to conduits 42 and 46 respectively. The $P_1$—$P_3$ pressure drop across the main fuel control 44 is controlled by the pump control 48 which operates in a manner to be described through suitable linkage mechanism connected to an air valve 56 disposed in the passage 32. The position of the air valve 56 is adjusted by the pump control to vary the flow of air to the air turbines 28 which in turn regulate the speed and the discharge rate of the centrifugal pumps 30.

An afterburner fuel control 58 is provided with an inlet conduit 60 which communicates with conduit 42 and an outlet conduit 62 which communicates with the afterburner fuel manifold 24. A normally closed afterburner fuel cut-off valve 63 arranged in conduit 62 is controlled by a solenoid 65 wired in series with a switch 67 which is actuated by a throttle lever 69. Speed governors 64 and 66 are driven by the low pressure compressor and the high pressure compressor respectively through any suitable means such as a conventional gear and shafting arrangement not shown. A nozzle area control 68 receives fluid under pressure from a supply source, not shown, and regulates the supply pressure to passages 76 and 78 which communicate with a servo motor 80 which in turn controls the position of the adjustable nozzle 20. To open the nozzle 20 high pressure fluid is supplied through passage 78 to the right hand side of piston 82 and to close the nozzle high pressure fluid is supplied through passage 76 to the left hand side of piston 82.

Temperature conditions at the inlet 11 and in the tailpipe 19 are sensed by resistance bulb 84 and thermocouple 86 respectively which are connected to an electronic amplifier 88 through lead wires 90 and 92 respectively. A speed request signal is supplied to the electronic amplifier 88 by a potentiometer 93 connected to and movable in accordance with the position of the throttle lever 69.

The electronic amplifier 88 is provided with suitable connections to the component devices in the system, which connections are labeled in FIGURE 1 in accordance with the signal transmitted by each. The electronic amplifier 88 receives the indicated request signals and corresponding signals indicative of existing conditions of engine operation and these signals are compared by means of various electrical networks within the amplifier. Resulting control signals are supplied by the electronic amplifier 88 to the main fuel control 44 and the nozzle area control 68. Reference is made to copending application 402,976 filed January 8, 1954 in the name of Warner C. Wintrode (common assignee) for a detailed description of one type of electronic amplifier which may be utilized for the portion of amplifier 88 which controls the valve motor in main fuel control unit 44. An amplifier for controlling a nozzle area control such as that shown at numeral 68 is disclosed in Patent No. 2,705,864 (common assignee).

Throughout the following description and claims, it is to be understood that the terms "normal condition of operation" and "emergency condition of operation," respectively refer to a condition of the fuel system whereby all of the component devices are functioning in their prescribed manner to control fuel flow to the engine in accordance with the selected variable of engine operation and to a condition whereby, as a result of a malfunction of one or more of the component devices, emergency apparatus is brought into operation which renders the affected component devices inoperative and which functions to control fuel flow to the engine in accordance with a minimum number of engine operating variables.

Figure 2:
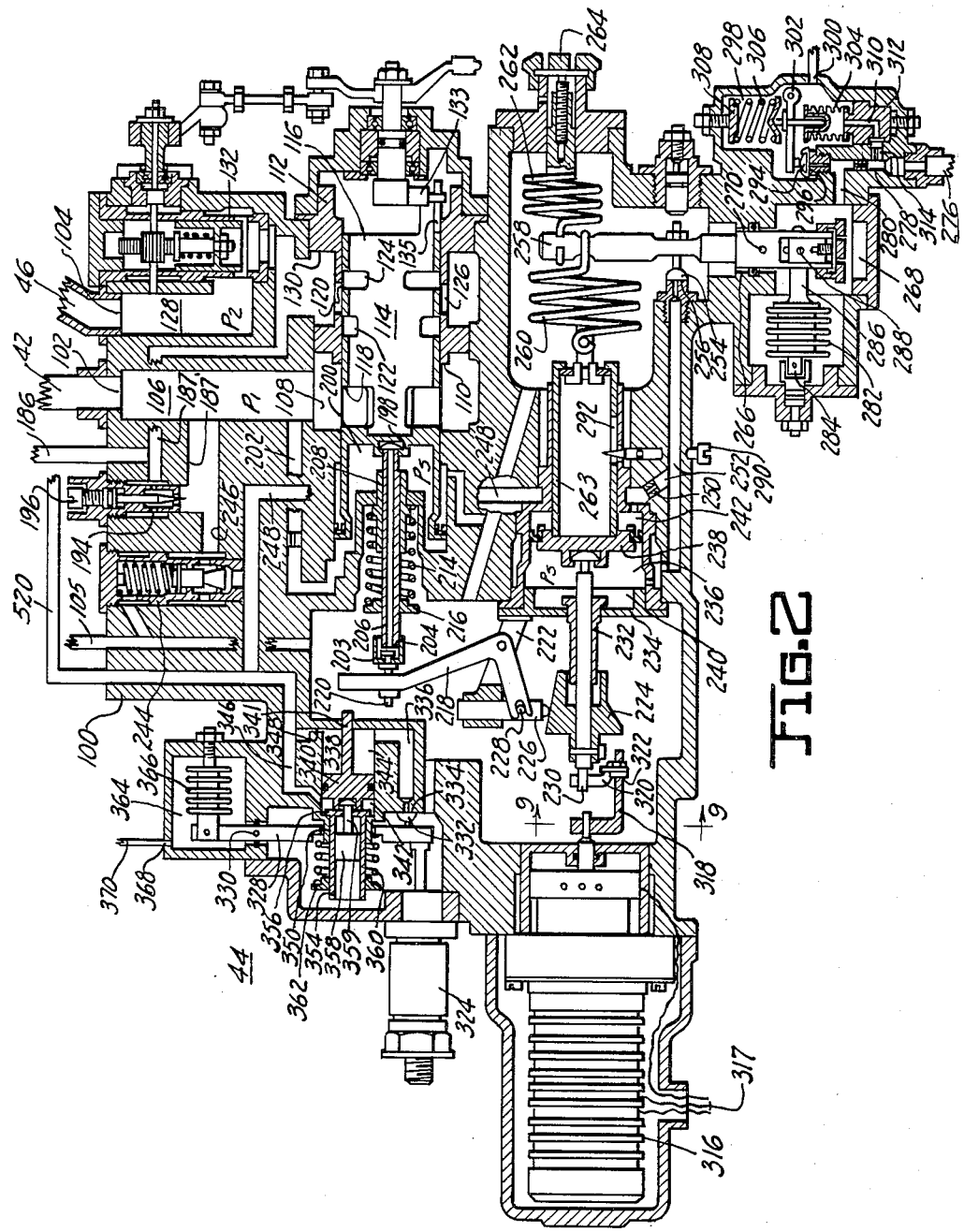
FIGURES 2 and 3 are sectional schematic views of the fuel control unit generally indicated at 44 in FIGURE 1, FIGURE 2 showing the lower (metering valve and control apparatus therefor) part.
Figure 3:
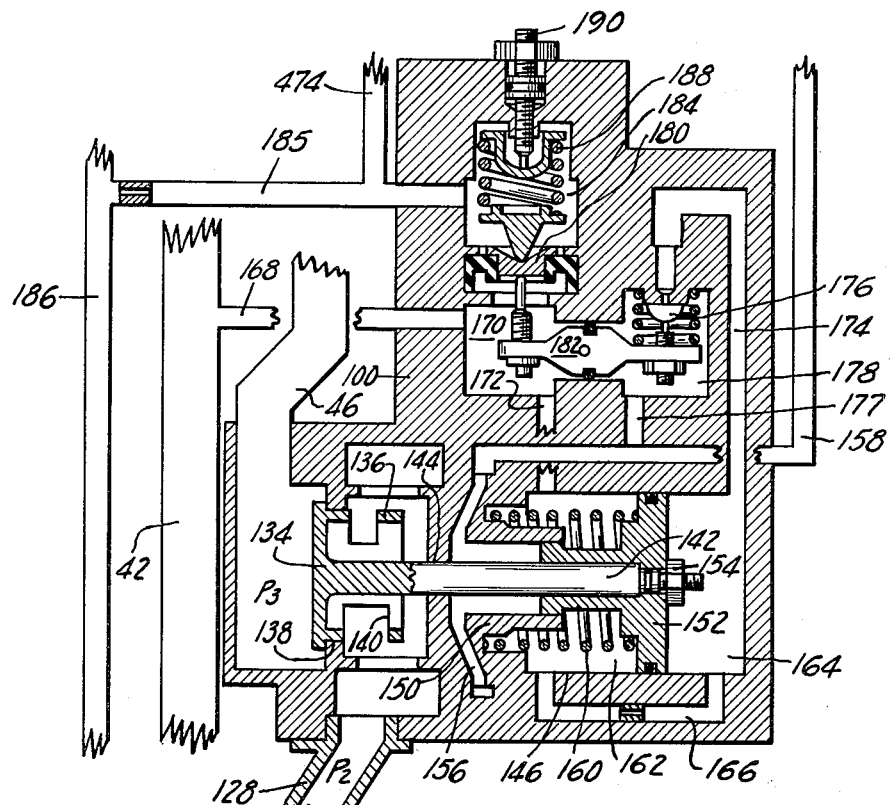

FIGURES 2 and 3 show the main fuel control 44 in detail. A casing 100 is provided with a fuel inlet 102 and a fuel outlet 104 connected to conduit 42 and conduit 46, respectively. The interior of the casing 100 is vented to pump inlet pressure $P_0$ via a drain passage 105. Fuel flows from the inlet 102 to the outlet 104 via a passage 106, annulus 108 and inlet ports 110 formed in a fixed sleeve member 112, a chamber 114 formed by an axially and rotatably actuable hollow cylindrical metering valve 116 and connected to ports 110 by valve inlet ports 118, a main metering valve port 120 formed by the interaction of either of two rectangular shaped metering valve ports 122 or 124 and sleeve outlet ports 126, and a conduit 128 connected to the outlet ports 126 via outlet annulus 130 in sleeve member 112. The metering valve 116 is positioned rotationally as a function of the position of the throttle lever 69 through a lever 133 fixedly secured to the throttle lever shaft and extending therefrom into engagement with an axial slot 135 formed in the wall of the metering valve 116. At any given position of throttle lever 69, the metering valve 116 is fixed in a corresponding position rotationally and free to move axially over the length of slot 135. Under normal conditions of operation, the metering valve 116 is restricted to a predetermined range of axial movement whereby the effective area of the main metering valve port 120 is dependent upon the position of metering valve port 124 relative to the sleeve outlet ports 126. During a normal condition of operation the effective area of the main metering port 120 varies in accordance with the axial position of metering valve 116 and thus metering port 124 only. To this end, the circumferential length of metering port 124 is dimensioned in accordance with the total range of movement of the throttle lever 69 so as to allow the metering valve 116 and thus metering port 124 to rotate without causing a corresponding change in the effective area of main metering port 120. Under emergency conditions of operation, the metering valve 116 is restricted to a different predetermined range of axial movement whereby the effective area of the main metering valve port 120 is dependent upon the position of metering valve port 122 relative to the sleeve outlet ports 126. A throttle lever actuated, normally open fuel cut-off valve 132 disposed in conduit 128 is biased through a rack and pinion arrangement to a closed position to cut off fuel flow to the engine when desired.

Now, referring to FIGURE 3, a throttling valve 134 is provided in conduit 128 downstream from the fuel cut off valve 132 to control the pressure drop across the metering valve 116 at a constant predetermined value. The throttling valve 134 is provided with a cup-shaped head 136 slidingly mounted in an orifice 138 in conduit 128. A plurality of ports 140 formed in the cup-shaped head 136 coact with the orifice 138 to vary the effective flow area thereof. A throttling valve stem 142 is slidably carried in an opening 144 in casing 100 through which it extends into a stepped bore 146. A reduced diameter section 150 of bore 146 slidably receives a reduced diameter section of a piston 152 through which the valve stem 142 extends and to which the stem is fixedly secured by a nut 154. A plurality of passages 156 connect the reduced diameter section 150 with a passage 158 leading to passage 477 (see FIGURE 1) at drain pressure $P_0$. A spring 160 interposed between the piston 152 and casing 100 acts to bias the throttling valve 134 toward a closed position. The piston 152 divides the stepped bore 146 into two variable volume chambers 162 and 164 which communicate with one another via a restricted passage 166. Fuel at pressure $P_1$ is transmitted from conduit 42 through a passage 168 and a chamber 170 to a passage 172 leading to the variable volume chamber 162 from which it flows through passage 166 to variable volume chamber 164 thence through an outlet passage 174 and a servo valve 176 to a chamber 178 from which it flows through a passage 177 to passage 158.

The servo valve 176 functions to control the flow out of variable volume chamber 164 and thus the pressure differential across piston 152 and its operation is controlled as a function of the pressure drop across the metering valve 116 by a piston 180 through a pivot lever 182. One side of the piston 180 communicates with chamber 170 at pressure $P_1$ and the other side of the piston communicates with conduit 128 at pressure $P_2$ via a chamber 184, a restricted passage 185, and passages 186 and 187. The piston 180 is pre-loaded by a spring 188 interposed between suitable spring retainers which engage piston 180 and an adjustable set screw 190, respectively.

The passages 187 and 187' are connected between conduits 106 and 128 in parallel flow relationship with metering valve 116 and are provided with an orifice 194 the effective area of which is established by the setting of an adjustable needle valve 196 threadedly engaged with casing 100. During decelerations, when the metering valve 116 is moved to a closed position, the passage 187, 187' will supply sufficient fuel to sustain combustion in the engine to prevent engine flame-out.

The metering valve 116 is positioned axially as a function of compressor discharge pressure $P_c$, engine speed, and temperature under normal conditions of operation and as a function of compressor inlet pressure $P_R$ under emergency conditions of operation. To this end, the metering valve 116 is provided with a servo piston 198 which is slidably carried in a chamber 200 to which fuel is supplied via a restricted passage 202 connected to the inlet conduit 106. The pressure $P_S$ within chamber 200 is controlled by a servo valve 203 which coacts with a valve seat 204 formed at one end of a tubular member 206 through which fuel flows from chamber 200 to the interior of casing 100 at drain pressure $P_0$. The other end of the tubular member 206 is removably secured to the center portion of the piston 198 through a pin and slot arrangement. The tubular member 206 is slidably carried in an opening 208 in casing 100. A spring 214 interposed between casing 100 and a spring retaining member 216 fixedly secured to the tubular member 206 acts in opposition to the fuel pressure in chamber 200 to bias the tubular member 206 toward a pivot lever 218. A push rod 220 threadedly engaged with pivot lever 218 and locked in position by a nut extends therefrom into engagement with the servo valve 202. The pivot lever 218 is rotatably mounted on a pin carried by a support arm 222 and is actuated by a three dimensional cam member 224 through a cam follower member 226 slidably carried in a suitable opening in support arm 222 and connected to pivot lever 218 through a pin 228. The cam member 224 is secured to an axially and rotatably movable support shaft 230. The support shaft 230 is slidably carried by a support sleeve 232 mounted in a central opening in a plate 234 through which the support shaft 230 extends into a chamber 236. A piston 238 slidably disposed in the chamber 236 divides the chamber into two variable volume chambers 240 and 242. The piston 238 is removably secured to the end of the support shaft 230 through any suitable connection such as the pin and slot arrangement shown. A spring loaded servo pressure regulating valve 244 of conventional design and operation communicates with inlet conduit 106 via passage 246 and passage 187' and functions to maintain a supply of fuel at a predetermined constant fuel pressure $P_{SR}$ for use with the various servo mechanisms which are to be described. A passage 248 transmits fuel at pressure $P_{SR}$ from the regulating valve 244 to the variable volume chamber 242 from which it flows through a restriction 250 and a passage 252 to the variable volume chamber 240 at pressure $P_S$. The pressure differential $P_{SR}-P_S$ to which the piston 238 responds is controlled by a flapper valve 254 which coacts with a valve seat 256 formed at one end of the passage 252 to vary the flow from passage 252 to the interior of casing 100 at drain pressure $P_0$. The flapper valve 254 is actuated by a lever 258, one end of which is connected to a feedback spring 260 and a trim spring 262, the opposite ends of which are connected to a sleeve 263 attached to piston 238 and retaining member 264 respectively. The retaining member 264 is threadedly engaged with casing 100 and may be adjusted to suit requirements as desired. The lever 258 extends through an opening 266 in casing 100 into a chamber 268 and pivots about a pin 270 fixedly secured to casing 100. The chamber 268 is supplied compressor discharge pressure $P_C$ from the compressor 13 via a pipe 276 (see FIGURE 1), restricted passage 278 and branch passage 280. The lever 258 is rotated in accordance with the pressure $P_C$ by the contraction or expansion of an evacuated bellows 282 mounted within chamber 268. An adjustable support member 284 extends from a fixed end of the bellows 282 into threaded engagement with casing 100. A link 286 extending from a movable end of the bellows 282 is pivotally mounted with lever 258 by means of an adjustable fulcrum 288. A stop member 290 threadedly engaged with casing 100 extends into a slot 292 formed in piston 238 and serves to limit the axial travel of the piston in either direction. The pressure $P_C$ within chamber 268 is limited to a predetermined maximum value by a flapper valve 294 which coacts with a valve seat 296 provided in passage 278 which opens into a chamber 298. The chamber 298 is vented to a suitable source of drain pressure $P_A$ such as the atmospheric or the compressor inlet via a port 300. A pivot lever 302 connected between the flapper valve 294 and a bellows 304 is biased to seat flapper valve 294 by a spring 306 interposed between the lever 302 and a spring retainer 308 adjustably secured to casing 100. The interior of the bellows 304 is vented to passage 278 via a passage 310 in an annular member 312 upon which the bellows is mounted and a restricted port 314. The annular member 312 is threadedly engaged with casing 100.

Figure 9:
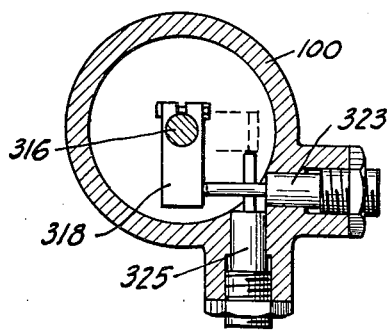
FIGURE 9 is a cross-sectional view taken on line 9—9 of FIGURE 1.

The rotational position of the cam member 224 is controlled as a function of engine speed and temperature by a motor generator set 316 which receives an actuating signal from the electronic amplifier 88 via electrical connections 317. The generator section of the motor generator set serves to produce a damping signal that is transmitted to the electronic amplifier 88 to prevent hunting in the system. Levers 318 and 320 are securely fixed in position at the ends of the motor generator shaft and shaft 230 respectively. The lever 318 is slidably engaged in an opening 322 in lever 320 such that the support shaft 230 is free to move axially in relation to lever 318 and is fixed in position rotationally relative to the lever 318. The lever 318 is restricted to rotational movement between limits established by adjustable stop members 323 and 325 (see FIGURE 9) which are threadedly engaged with casing 100 and which may be adjusted to suit requirements as desired.

The metering valve 116 is actuated to an emergency position by the de-energization of an electrical solenoid 324 in response to the opening of a manually operated normally closed switch (not shown) on the operator's control panel or in response to a power failure in the 115 v., 400 cycle or 24 v. D.C. electrical system. Under normal operating conditions when the solenoid is energized the solenoid plunger is biased into engagement with a lever 328 pivotally mounted on a pin 330 secured to casing 100. The lever 328 actuates a flapper valve 332 against a valve seat 334 connected to a discharge passage 336 which communicates with a chamber 338. A piston 340 is slidably mounted within chamber 338 and divides the chamber into variable volume chambers 342 and 344. An integral stem 341 extending from the piston 340 is slidably carried in an opening at one end of chamber 344 and is arranged to contact lever 218. The variable volume chamber 342 is supplied fuel at pressure $P_{SR}$ via a passage 346 and passage 248 and the variable volume chamber 344 is supplied fuel at pressure $P_{SR}$ via a restricted passage 348 connected to passage 346. A sleeve member 354 slidably carried in an opening 350 in casing 100 is provided with a flanged closed end 356 which engages casing 100 and serves to limit the movement of the sleeve member outward with respect to chamber 338. A piston 358 reciprocably mounted in sleeve member 354 is provided with a stem 359 that extends through an aperture in the closed end of sleeve 354 into engagement with piston 358. A spring 360 is interposed between the lever 328 and a spring retainer 362 secured to sleeve member 354. The lever 328 extends through an opening in casing 100 into a chamber 364 where it is pivotally connected to the movable end of an evacuated bellows 366. The chamber 364 is vented to compressor inlet pressure $P_1$ via a port 368 and pipe 370 (see FIGURE 1). To transfer to emergency operation, the solenoid valve 324 is de-energized allowing lever 328 to rotate clockwise and unseat flapper valve 332. The subsequent drop in fuel pressure in variable volume chamber 344 causes the piston 340 to move toward the right bringing the stem 341 into engagement with lever 218 whereupon the follower member 226 is disengaged from the surface of the cam member 224 and the flapper valve 202 is seated against valve seat 204. The subsequent rise in pressure in chamber 200 forces the metering valve 116 toward the right whereupon communication between the outlet port 126 and the metering port 124 is interrupted and communication between the outlet port 126 and metering port 122 is established.

The piston 358 follows the travel of piston 340 and is allowed a predetermined degree of lost motion before coming into contact with sleeve member 354 after which said sleeve member is urged toward the right against the force of spring 360. The motion of sleeve member 354 is transmitted through spring 360 to the lever 328. The lever 328 is rotated counterclockwise whereupon the flapper valve 332 is moved toward valve seat 334 to adjust the pressure in variable volume chamber 344 to the value required to rebalance the system. Altitude compensation under emergency operation is provided for by the bellows 366 which responds to compressor inlet pressure and adjusts the position of lever 328 and flapper valve 332 accordingly, whereupon the metering valve 116 is controlled in the aforementioned manner to cause an increase or a decrease in fuel flow depending upon the relative change in inlet pressure.

In FIGURES 4 and 5, respectively, the fuel pump control unit 48 and fuel pumping units 26 of FIGURE 1 are shown in greater detail. Each of the fuel pumping units 26 is provided with an air driven turbine 28 drivably connected to a centrifugal fuel pump 30 via a shaft 371. The air turbine is driven by air at compressor discharge pressure $P_C$ which flows from passage 32 through an air inlet 372 thence through the turbine blades to a discharge port from which it discharges to the atmosphere. The centrifugal fuel pumps 30 receive fuel at boost pump pressure $P_0$ via conduit 36 and inlet ports 373 and discharge fuel to volutes 373' connected to passages 40. Each of the passages 40 contain a check valve 374 which in the event of a failure of one of the pumps closes to prevent reverse flow therethrough. The fuel pump control unit 48 is provided with a casing 375 having inlet ports 376 and 378 which communicate with conduits 46 and 42 respectively via passages 52 and 50 and an outlet port 382 which communicates with conduit 36 via passage 384. A piston 386 is slidably disposed in a chamber 388 in casing 375. A piston rod 390 extends from one face of the piston 386 through an opening 392 in casing 375 at one end of the chamber 388 and a reduced diameter section 394 extends from the opposite face of the piston through an opening 396 in a cap 398 at the opposite end of chamber 388. The cap 398 is locked in position against casing 375 through any suitable fastening means, not shown. A fuel pressure regulating valve 400 of conventional design and operation is supplied fuel at pressure $P_1$ via inlet port 378, a bore 402 and a passage 404 and functions to maintain a supply of fuel at a predetermined constant pressure $P_{SR}$ to a discharge passage 406 which communicates with chambers 408 and 410 oppositely disposed to piston 386 via a restricted passage 412 and a restricted passage 416, respectively. The chamber 410 is provided with a discharge passage 420 which communicates with outlet port 382 via chamber 417. The bore 402 is divided into two chambers 422 and 424 by a diaphragm 426, the periphery of which is securely attached to casing 375. The diaphragm 426 is responsive to the pressure differential between chamber 422 at pressure $P_1$ and chamber 424 which receives fuel at pressure $P_3$ via inlet port 376. The diaphragm 426 is suitably preloaded by a spring 432 connected between a spring retaining member 434 secured to the central portion of the diaphragm and an adjustable spring retaining member 436 carried by a cap 438 which seals the end of bore 402. A lever 440 pivotally supported by a pin 442 fixedly secured to casing 375 extends through an opening 444 between chamber 417 and bore 402 and is actuated by the diaphragm 426 through a push rod 446 threadedly engaged with one end of lever 440. The opposite end of the lever 440 is in contact with a ball servo valve 448 which coacts with a valve seat 450 at the end of passage 420 to regulate the fuel flow out of chamber 410 and thus the pressure differential across piston 386. A feedback spring 452 is interposed between rod 390 and lever 440. Movement of piston 386 is transmitted to the air valve 56 through a linkage comprising a fulcrum member 454 pivotally carried on a support member 456 and connected to reduced diameter section 394 and air valve 56 via links 458 and 460 respectively (see FIGURE 1). The displacement of link 460 for a given increment of movement of link 458 may be varied to suit the requirements of a particular system by suitable positioning of the links in holes 462 provided in the fulcrum member 454.

Referring to FIGURE 6, the low pressure compressor speed governor 64 functions to modify the predetermined $P_1 - P_2$ pressure differential across the piston 130 (FIGURE 3) which controls the position of the throttling valve 134 to reduce fuel flow to the engine in accordance with a maximum allowable low pressure compressor speed by venting the passage 185 to drain pressure $P_0$. The unit 64 includes a casing 464 provided with a chamber 466 having restricted inlet ports 468 and 470 which communicate with passage 185 and conduit 60 respectively via passages 474 and 472 and an outlet port 476 which communicates with fuel at drain pressure $P_0$ via passage 477 leading to the inlet of the fuel pumps 30. The passage 474 and inlet port 470 provide for continuous flow of fuel at pressure $P_1$ to chamber 466 for cooling purposes, Within the chamber 466, a plurality of weights 480 is pivotally mounted on anchor pins 482 fixedly secured to a rotatable carrier 484. The carrier 484 is rotated in accordance with the speed of the low pressure compressor through a suitably connected conventional gear and shafting arrangement, not shown. Arms 486 are fixedly secured to the weights 480 and extend therefrom into engagement with a thrust member 488 slidably mounted on a stem 490. The stem 490 is secured to carrier 484. A lever 492 pivotally mounted on a suitable fixed support 494 is provided with an arm 496 against which the thrust member 488 bears, an arm 498 which engages a servo valve 500 connected to the inlet port 468, and an arm 502 which carries one end of a spring 504. The other end of the spring 504 is secured to an adjustable spring retainer 505. A notch or indentation 506 cut into the thrust member 488 at the point of contact with lever 496 acts to prevent rotation of the thrust member. This results in a relative motion between the thrust member 488 and the stem 490 as well as between the thrust member and the weights 480 at all times during operation such that "dead band" operation in the governing range is reduced. One end of a balance piston 507 slidably mounted in a passage 509 extends into chamber 466 into engagement with arm 502. The opposite end of the piston 507 communicates with pressure $P_1$ at the inlet port 470 via passage 505. The diameter of the balance piston 507 is such that if the $P_1-P_0$ pressure differential across the piston and the $P_2-P_0$ pressure differential across the closed flapper valve 500 were equal the resulting forces acting on the lever 492 would be equal. Since the $P_1-P_2$ pressure differential is maintained constant by the action of the throttling valve 134, the $P_1-P_2$ and $P_2-P_0$ pressure differentials are not equal and an unbalanced force will always exist which tends to act on the lever 492 in a direction to close flapper valve 500. This force will be constant and may be compensated for by suitable adjustment in the tension of spring 504. Without balance piston 507, the $P_2-P_0$ pressure differential unbalance tending to open the flapper valve 500 would increase with an increase in the pressure $P_2$ and would cause the flapper valve 500 to open at a speed lower than the set speed at which the low pressure compressor is intended to be governed. An adjustable stop member 508 is threadedly engaged with casing 464 and engages the arm 502 to limit the counterclockwise rotation of lever 492 as desired.

Referring now to FIGURE 7, the high pressure compressor speed governor 66 is shown in a sectional schematic view. The governor 66 functions in the same manner as the low pressure compressor governor 64 to modify the $P_1-P_2$ pressure differential across the metering valve 116 and cause a reduction in fuel flow to the engine in response to a predetermined maximum allowable high pressure compressor speed. The governor 66 is provided with a casing 510 having inlet ports 512 and 514 and an outlet port 516. Inlet port 512 communicates with passage 474 via a passage 518 and the inlet port 514 communicates with regulated fuel pressure $P_{SR}$ via a passage 520. The outlet port 516 is connected to passage 477 via a passage 521. A set of weights 522 pivotally mounted on a carrier 524 which rotates in a chamber 526 in casing 510 is driven through a shaft 528 connected to the armature of a tachometer generator 530. The tachometer generator is drivably connected to the high pressure compressor 13 through conventional gears and shafting, not shown, and generates an electrical speed signal which is supplied to the electronic amplifier 88 via a suitable connection 532. The weights 522 are provided with arms 534 that bear against a cylindrical thrust member 536 which is slidably carried on a stem 537 fixedly secured to carrier 524. The output force of the weights 522 is transmitted to the thrust member 536 which in turn engages one end of a pivot lever 538 secured to a support rod 540. A notch or indentation 539 is provided in the thrust member 536 at the point of contact with the lever 538 for the same purpose as that of the abovementioned notch 506 in thrust member 488. A spring 541 interposed between lever 538 and an adjustable spring retainer 543 threadedly engaged with casing 510 serves to preload the lever. The support rod 540 is mounted for rotation with casing 510 and is secured to another lever 542. A servo piston 544 is slidably carried in a chamber 546 and divides the chamber into variable volume chambers 548 and 550 which communicate with inlet port 514 via passage 552 and restricted passage 554, respectively. The fuel pressure $P_S$ in variable volume chamber 550 is controlled by a flapper valve 556 which is actuated by the lever 538 and which coacts with a valve seat 558 connected to the discharge end of a passage 560, through which fuel flows from chamber 550 to chamber 526. The servo piston 544 is provided with a piston rod 562 that extends through an opening in casing 510 at the end of chamber 546 into chamber 526 into engagement with one end of a feedback spring 564, the opposite end of which is connected to a spring retainer 566 threadedly engaged with lever 542. A rack 568 formed on the piston rod 562 is engaged by a pinion 570 fixedly secured to a support shaft 572 which is mounted for rotation in suitable anti-friction bearings. A cam 574 is fixedly secured to the end of the support shaft 572 and at a predetermined high pressure compressor speed serves to close a normally open electrical switch 576 connected to a speed lockout solenoid (not shown) in the nozzle area control 68 and to the electronic amplifier 88 via suitable connections (see FIGURE 1). De-energization of the speed lockout solenoid results in a control signal to the nozzle area control mechanism in response to which the exhaust nozzle area is maintained at a predetermined fixed value. When the speed lockout solenoid is energized by the closing of switch 576, the control signal is modified to bring the nozzle area control mechanism into operation whereupon the exhaust nozzle area is varied in accordance with the position of the throttle lever 67 and engine temperature.

A pivot lever 580 mounted on a support 582 extends into engagement with a flapper valve 584 which coacts with a valve seat 586 provided at the end of a passage 588 connecting inlet port 512 with chamber 526. An adjustable arm 590 threadedly engaged with the pivot lever 580 is engaged by the thrust member 536 at a predetermined high pressure compressor speed whereupon the pivot lever 580 rotates clockwise to open flapper valve 584 and dump $P_2$ fuel pressure in passage 518 to drain pressure $P_0$. A spring 592 interposed between lever 580 and casing 510 acts to preload the lever. A spring 594 interposed between lever 580 and a spring retainer 596 acts to assist in the opening and closing of flapper valve 584. The spring retainer 596 is slidably engaged in a passage 598 connected to passage 588 and in response to the fuel pressure in passage 598 acts to vary the spring load acting against lever 580.

For a detailed description of the nozzle area control 68 reference is made to copending application Serial No. 620,405 filed November 5, 1956 in the name of George R. Pavlick (common assignee). The nozzle area control 68 operates in response to a plurality of signals among which are signals representing temperature, throttle lever position, emergency operation, and high pressure compressor speed and functions to control the position of the nozzle 20 in accordance with said signals to maintain operating conditions within the engine within desired limits. A similar nozzle area control device is also described in the aforementioned Patent No. 2,705,864.

Figure 8:
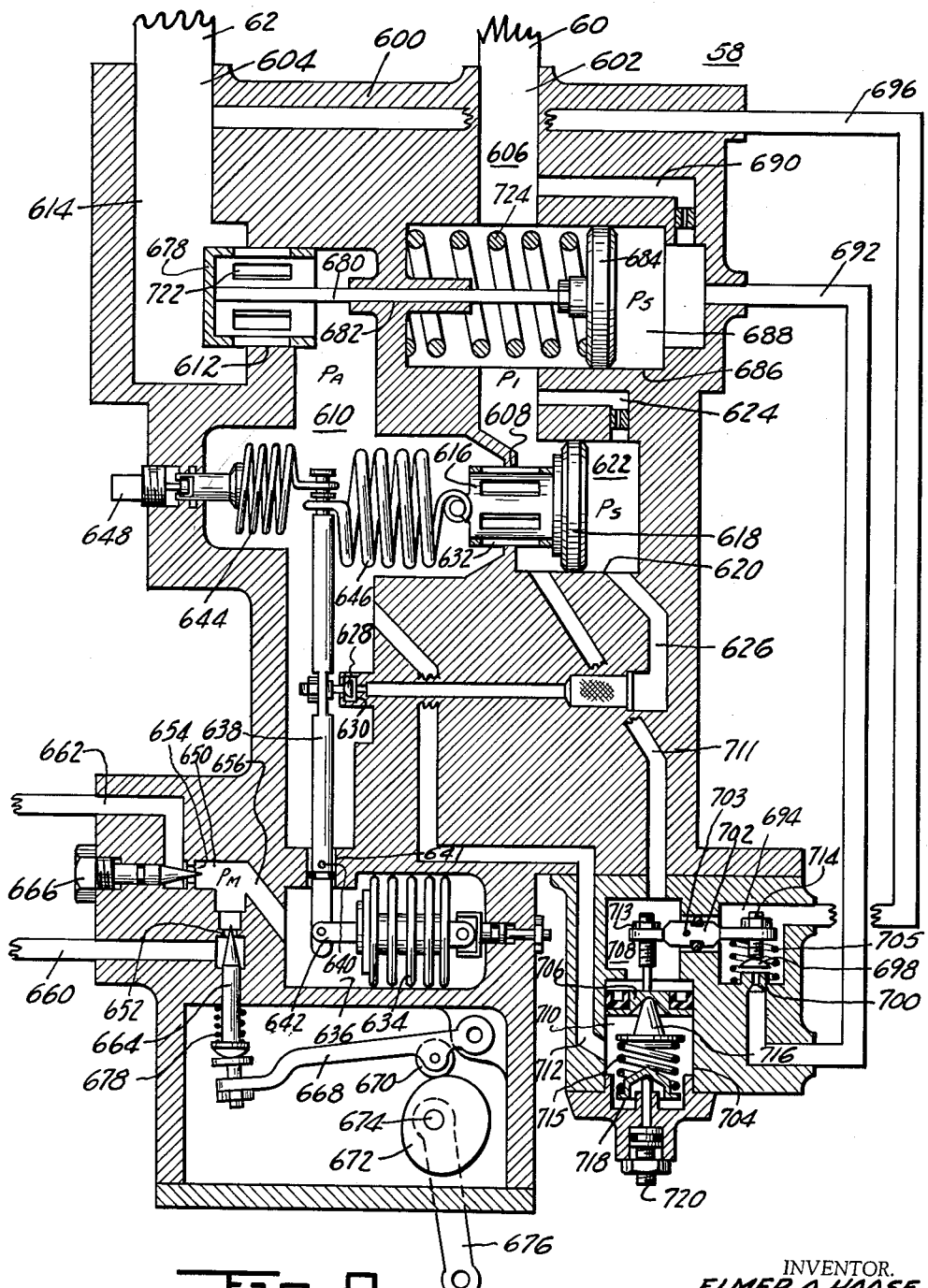
FIGURE 8 is a sectional schematic view of the afterburner fuel control of FIGURE 1.

Referring to FIGURE 8, the afterburner fuel control 58 functions to control fuel flow to the afterburner as a function of the position of the throttle lever 69 and compressor discharge pressure $P_c$. It includes a casing 600 having an inlet port 602 and an outlet port 604 connected to conduits 60 and 62, respectively. Fuel flows from the inlet to the outlet via a conduit 606, a metering valve orifice 608, a chamber 610 connecting the orifice 608 with a throttling valve orifice 612 through which the fuel flows to a conduit 614. A servo powered metering valve 616 is provided with a piston 618 slidably carried in a bore 620. The piston 618 and bore 620 together form a variable volume chamber 622 which receives fuel from a conduit 606 via a restricted passage 624 and which discharges fuel to chamber 610 via a passage 626 and a flapper valve 628 which coacts with a valve seat 630 formed at the discharge end of passage 626. The metering valve 616 is slidably engaged with orifice 608 and is provided with a plurality of axial slots 632 which control the effective flow area of orifice 608 in accordance with the axial position of the metering valve 616. The metering valve 616 is positioned by the piston 618 in response to the pressure $P_s$ in variable volume chamber 622, which pressure is controlled as a function of compressor discharge pressure $P_c$ by a bellows 634 mounted in a chamber 636 and connected to the flapper valve 628 through a pivot lever 638. The lever 638 is pivotally mounted on a pin 640 and extends through an opening 641 between chambers 610 and 636. One end of the lever 638 is pivotally connected to a link 642 which extends from the movable end of bellows 634 and the opposite end of the lever is connected to a trim spring 644 and a feedback spring 646. The trim spring 644 is attached to an adjustable spring retainer 648 threadedly engaged with casing 600. The feedback spring 646 is attached to the metering valve 616. The chamber 636 is supplied modified compressor discharge pressure $P_m$ via a passage 656 from a passage 650 connected between two orifices 652 and 654. The orifice 652 communicates with a passage 660 leading to passage 276 at compressure discharge pressure $P_c$. The orifice 654 communicates with a passage 662 which communicates with ambient air pressure or any suitable low pressure source. Needle valves 664 and 666 are arranged to coact with orifices 652 and 654 respectively. The needle valve 666 is threadedly engaged with casing 600 and may be adjusted to increase or decrease the effective flow area of orifice 654 as desired. The needle valve 664 is slidably engaged with casing 600 and is activated by a pivot lever 668. The lever 668 is provided with a cam follower member 670 which rides on the surface of a cam member 672. The cam member 672 is secured to a support rod 674 suitably mounted for rotation on casing 600. The cam member 672 is rotated as a function of the position of the throttle lever 69 by a lever 676 fixedly secured to the support rod 674 and actuated by the throttle lever 69 through suitable connecting linkage. A light rate spring 678 bears against the needle valve 664 and serves to maintain a slight pre-load on the lever 676. The pressure $P_m$ generated between the two orifices 652 and 654 varies as a function of compressor discharge pressure $P_c$ and is modified as a function of the position of the throttle lever 69 by varying the area ratio of the orifices 652 and 654.

A throttling valve 678 slidably engaged with orifice 612 is provided to maintain a predetermined constant pressure drop across the metering valve orifice 608. A throttling valve stem 680 extends through an opening 682 in casing 600 into engagement with a piston 684 slidably mounted in a bore 686. The piston 684 and bore 686 together form a variable volume chamber 688 which receives fuel from conduit 606 via a restricted passage 690 and discharges fuel to conduit 614 via a passage 692; a chamber 694 and a passage 696. The rate of discharge from variable volume chamber 688 is controlled by a flapper valve 698 which operates with a valve seat 700 formed at the end of passage 692 and which is actuated by a pivot lever 702 mounted on a pin 703 secured to casing 600. A spring 705 preloads the lever 702 in a counterclockwise direction. A piston 706 divides a bore 704 into variable volume chambers 708 and 710 which communicate with conduit 606 and chamber 610, respectively, via passages 711 and 712. A push rod 713 threadedly engaged with lever 702 extends therefrom into engagement with piston 706. A push rod 714 threadedly engaged with the opposite end of lever 702 extends therefrom into engagement with flapper valve 698. A spring preload is applied to piston 706 by a spring 715 interposed between spring retainers 716 and 718 which engage piston 706 and an adjustable set screw 720, respectively.

The throttling valve 678 is provided with a series of axial slots 722 which coact with the orifice 612 to provide a greater or lesser effective flow area of the orifice 612 depending upon the position of the throttling valve 678. A spring 724 interposed between casing 600 and piston 684 serves to bias the throttling valve 678 toward a closed position.

Pressure variations from the predetermined constant pressure drop across metering valve orifice 608 are sensed by the piston 706 which rotates lever 702 and causes the flapper valve 698 to be repositioned which in turn causes a corresponding change in the pressure $P_s$ in chamber 688. The change in pressure $P_s$ causes actuation of the piston 684 and throttling valve 678 in one direction or the other, depending upon the relative error in the constant pressure drop. Assuming the pressure drop across the metering valve 616 to be larger than the predetermined constant value the pressure $P_s$ in chamber 688 would be increased causing the throttling valve 678 to move in an opening direction which action would decrease the pressure in chamber 610 to the value required to re-establish the pressure drop to the predetermined value. Reverse operation would occur if the pressure drop across the metering valve 616 was below the predetermined constant value.

Referring to FIGURE 1, an engine starting fuel regulator 726 is provided to regulator the flow of fuel from an engine driven positive displacement fuel pump 728 which supplies fuel to the conduit 42 for starting purposes. The fuel pump 728 receives fuel from the fuel source 38 and discharges into a conduit 730 connected to the starting fuel regulator 726 and the conduit 42. The starting fuel regulator is provided with a spring loaded by-pass valve (not shown) which functions in a conventional manner to by-pass fuel from conduit 730 to a drain conduit 732 leading from the fuel regulator to conduit 36. A passage 734 connects the starting fuel regulator 726 with passage 186 in the main fuel control 44 at $P_2$ pressure. The by-pass valve responds to the $P_1-P_2$ pressure differential supplied thereto to by-pass fuel in excess of a predetermined $P_1-P_2$ pressure differential to passage 732. The predetermined $P_1-P_2$ pressure differential results in sufficient fuel flow to the burners 14 to initiate combustion whereupon the air turbine driven fuel pumps 30 are driven by the compressor discharge pressure $P_c$. When the air turbine pumps are operating at a speed whereby the discharge pressure $P_1$ in conduit 42 exceeds that of the discharge pressure of the positive displacement pump 728, a check valve 736 in the conduit 730 closes to prevent reverse flow through the conduit 730. The starting fuel pump 728 is rendered inoperative above a predetermined engine speed by conventional control means which, in response to the predetermined engine speed, causes a shut down of the pump 728.

*Operation*

Assume at the outset a condition of engine idling, at which time the fuel system is in equilibrium, with the main fuel control 44 metering the required quantity of fuel to the engine, the afterburner fuel cutoff valve 63 closed and the exhaust nozzle area control 68 rendered inoperative by the aforementioned speed lockout circuit. Considering a selected change of speed, e.g. an acceleration to maximum speed in the dry or non-afterburning engine operating range, the throttle lever 69 is moved to a 90° throttle angle position corresponding to the requested speed. The metering valve 116 is rotated in accordance with the throttle lever position causing the metering valve port 124 to move to a new position relative to the sleeve outlet port 126, which movement, as heretofore mentioned, does not effect a change in the effective area of main metering port 120. At the same time, a request signal indicative of the throttle position is supplied by the potentiometer 93 to the electronic amplifier 88. The request signal is fed into the speed network in the amplifier 88 where it is compared with the existing speed signal supplied by tachometer generator 530. The resulting speed error signal which represents an underspeed condition, is then transmitted to the motor section of the motor generator set 316 which responds and rotates cam member 224, the contour of which is such that lever 218 is caused to rotate counterclockwise. The movement of lever 218 results in displacement of servo valve 203 away from valve seat 204 which in turn causes a drop in pressure $P_S$ in chamber 200 such that the metering valve 116 moves axially in a direction to increase the effective flow area of the main metering port 120. The piston 180 responds to the increase in $P_2$ pressure in chamber 184 and moves downward causing lever 182 to rotate in a counterclockwise direction which in turn activates flapper valve 176 toward a closed position. The subsequent rise in pressure $P_S$ in chamber 164 acts against piston 152 which moves toward the left and actuates the throttling valve 134 in an opening direction to increase the effective flow area of orifice 140 and increase flow through orifice 138 thereby reducing pressure $P_2$ to reestablish the required predetermined constant $P_1-P_2$ drop across the metering valve 116. The fuel flow to the burners increases as a result of increased $P_3$ pressure and the engine accelerates. The rise in pressure $P_3$ in conduit 46 is transmitted through passage 52 to chamber 424 in the pump control 48 where it acts to displace the diaphragm 426 upward away from lever 440. The lever 440 in turn rotates clockwise under the influence of feedback spring 452 and actuates the ball valve 448 toward valve seat 450 whereupon the pressure $P_S$ in chamber 410 increases and activates piston 386 upward. The upward movement of piston 386 results in clockwise movement of the fulcrum member 454 which movement is transmitted through rod 460 to the air valve 56. The air valve 56 is biased in an opening direction to admit more air to the air turbines 28 whereupon the rotational speed of the air turbines and thus the rotational speed of the fuel pumps 30 is increased. This results in an increase in the discharge rate of the fuel pumps 30 and a corresponding increase in the pressure $P_1$ in conduit 42. The pressure $P_1$ is transmitted through conduit 42 and passage 50 to chamber 422 in the pump control 48 where it acts against the diaphragm 426 in opposition to to the pressure $P_3$. Upon reaching a pressure $P_1$ which establishes a predetermined $P_1-P_3$ differential, the diaphragm 426 is balanced. The lever 440 and ball valve 448 are stabilized in response to a balance of forces between diaphragm 426 and spring 452 acting against lever 440 and the pressure $P_S$ in chamber 410 will be maintained at the value required to hold piston 386 fixed until another change in pressure $P_1$ or pressure $P_3$ occurs.

As the engine accelerates toward the requested speed, compressor discharge pressure $P_c$ increases causing the bellows 282 to contract and rotate lever 258 in a clockwise direction which results in movement of flapper valve 254 away from valve seat 256 and a corresponding drop in pressure $P_S$ in chamber 240. The drop in pressure $P_S$ results in leftward movement of piston 238, which movement is transmitted back to the lever 258 through an increasing feedback spring 260 load which acts to rotate lever 258 in a counterclockwise direction until the feedback spring load is balanced by the combined force of bellows 282 and trim spring 262 at which point the piston 238 is stabilized. The movement of piston 238 is transmitted through rod 230 to the cam member 224. The follower member 226 follows the contour of cam member 224 and moves downward causing lever 218 to rotate in a counterclockwise direction which, in turn, actuates flapper valve 203 away from the valve seat 204. This results in a drop in pressure $P_S$ in chamber 200 which results in a displacement of the metering valve 116 and tubular member 206 toward the left in response to the force exerted by spring 214 whereupon the axial position of the valve port 124 relative to the sleeve port 126 is adjusted to increase the axial opening of metering valve port 120. This results in an increase in fuel flow through metering valve 116 to the burners. The follow-up action of tubular member 206 with respect to flapper valve 203 results in stabilization of the metering valve 116 in response to a force balance between pressure $P_S$ acting against piston 198 and the force of spring 214.

As the engine approaches the selected speed, a speed anticipation network in the electronic amplifier 88 functions to compare the throttle requested speed signal with the speed signal supplied by the tachometer generator 530. The comparison results in a signal which is transmitted from the electronic amplifier 88 to the motor generator set 316, the motor section of which responds to the signal and rotates the lever 318 which in turn rotates the cam member 224 in a direction to cause clockwise movement of lever 218 and a corresponding increase in pressure $P_S$ in chamber 200. The metering valve 116 is repositioned to reduce the axial opening of metering port 120 whereupon the fuel flow through the metering valve to the burners is reduced to the value required to maintain the requested speed. The generator section of the motor generator set 316 functions to supply a feedback signal to the electronic amplifier in response to which the amplifier output signal to the motor section is modified to prevent hunting of the system.

Resistance bulb 84 and thermocouple 86 respond to compressor inlet temperature and tailpipe temperature respectively and supply signals which are transmitted to the electronic amplifier 88. During operation of the engine the turbine discharge temperature must be maintained below a maximum allowable value if damage to the engine is to be avoided. This is accomplished by a temperature control network which forms part of the electronic amplifier and which receives the temperature signals from resistance bulb 84 and thermocouple 86. These temperature signals are each compared with a regulated D.C. reference signal. During engine accelerations, if the tailpipe temperature thermocouple signal should exceed the D.C. reference signal, the resultant error signal will override the aforementioned speed signal supplied by the electronic amplifier and the signal transmitted to the motor generator set 316 will be such that the metering valve 116 will be controlled in a closing sense to reduce fuel flow to the engine and thus limit the tailpipe temperature to a safe value. Under steady state operating conditions above the aforementioned predetermined high pressure compressor speed at which the electrical switch 576 is closed, the tailpipe temperature is compared with an adjustable reference voltage in the temperature control network of the electronic amplifier. The reference voltage corresponds to a maximum allowable temperature and if exceeded by the tailpipe temperature signal, the comparison results in a signal which is supplied by the electronic amplifier 88 to the exhaust nozzle area control 68. The exhaust nozzle area is then adjusted to reduce the tailpipe temperature to the desired safe limit.

To illustrate the operation of the low pressure compressor governor, it will be assumed that an overspeed condition of the low pressure compressor is encountered. Upon reaching a predetermined maximum allowable speed, the weights 480 exert sufficient force against the lever 492 to overcome the spring 504 force and rotate lever 492 counterclockwise. The flapper valve 500 is lifted off its valve seat and the $P_2$ pressure in chamber 184 of the throttling valve constant head unit escapes via passages 185 and 472 to drain pressure $P_0$ in chamber 466. The drop in chamber 184 pressure $P_2$ results in upward movement of the piston 180 which in turn allows lever 182 to rotate clockwise causing flapper valve 176 to open and release the pressure $P_S$ in chamber 164. The throttling valve 134 is biased toward a closed position thereby reducing the $P_1-P_2$ pressure drop across the metering valve 116 and the fuel flow to the burners 14 to cause a reduction in engine speed. Following a decrease in the low pressure compressor speed to a value below the maximum allowable speed, the spring 504 force overcomes the force of the weight 480 and the flapper valve 500 is again seated, thereby closing passage 475. The throttling valve 134 then resumes its normal operation of maintaining the $P_1-P_2$ differential across the returning valve 116 at the predetermined constant value.

The operation of the high pressure compressor speed governor is similar to that of the low pressure compressor speed governor and in addition to speed governing has the additional function of providing a speed signal for controlling the speed lockout solenoid in the exhaust nozzle area control 68 and an afterburner speed lockout relay in the electronic amplifier 88. The weights 522 provide an output force which varies as a function of high pressure compressor speed. For any given speed of the high pressure compressor, a corresponding weight force is generated which acts through the thrust member 536 and lever 538 to position flapper valve 556 and establish a corresponding pressure $P_S$ in chamber 550 in response to which the piston 544 is positioned such that a force balance exists between the weights 522 and the spring 564. As speed increases the flapper valve is lifted away from the valve seat 558, such that the pressure $P_S$ in chamber 550 is progressively diminished which, in turn, causes the piston 544 to respond in a downward direction toward an adjustable stop member 545. As the piston 544 moves, the cam 574 is rotated through the pinion 570 and rack 568. At a predetermined speed when it is desired to begin control of the exhaust nozzle area in accordance with the selected parameters of engine operation, the switch 576 is closed by the cam 574 whereupon the speed lockout solenoid in the exhaust nozzle area control 68 is energized. Upon reaching a predetermined maximum allowable speed, the piston 544 is biased against the stop member 545 causing an unbalance of forces between the weights 522 and spring 564 which results in the thrust member 536 moving into contact with arm 590 which causes pivot lever 580 to rotate clockwise opening flapper valve 584, which in turn allows the $P_2$ pressure in chamber 184 of throttling valve constant head unit to escape via passages 185, 474 and 518 to drain pressure $P_0$. The maximum allowable speed at which the arm 590 is actuated may be varied to suit requirements by adjusting the stop member 545 in one direction or the other as desired. The throttling valve 134 is controlled in the same manner as previousuly described in regard to over-speeding of the low pressure compressor speed which action results in a reduction in the $P_1-P_2$ pressure drop across the metering valve 116 and a corresponding drop in fuel flow to the burners 14. The speed of the high pressure compressor 13 is reduced to a value below the predetermined maximum allowable value whereupon the flapper valve 584 is closed and the throttling valve 134 resumes the function of maintaining the aforementioned predetermined constant pressure drop across the metering valve 116.

Afterburner fuel flow is initiated when two conditions of engine operation have been attained. To prevent fuel from reaching the afterburner fuel manifold in advance of the aforementioned predetermined high pressure compressor speed at which the switch 576 is closed and before a 90°–93° throttle angle is reached the throttle lever actuated switch 67 is wired in series with an afterburner speed lockout relay (not shown) in the electronic amplifier 88. Closing of the switch 576 results in a signal which actuates the speed lockout relay and closes that portion of the circuit. At the 90°–93° throttle angle range, the switch 67 is closed whereupon the solenoid 65 is energized and the fuel cut-off valve 64 opened. Thus, both of the above-mentioned conditions must be met before the solenoid operated fuel cut-off valve 63 is opened. Assuming that these required conditions have been met and the fuel cut-off valve is open, the afterburner fuel control 58 meters fuel in accordance with the position of the throttle lever 69 as follows: The cam member 672 is rotated in a clockwise direction with increasing angle of throttle lever 69. The cam follower 670 follows the contour of the cam member and allows lever 668 to rotate in a counterclockwise direction whereupon the needle valve 664 moves downward causing an increase in the area of orifice 652 and a corresponding increase in pressure $P_m$ in chambers 650 and 636. The bellows 634 contracts in response to the increase in $P_m$ pressure and causes lever 638 to rotate counterclockwise whereupon the flapper valve 628 is opened and pressure $P_S$ in chamber 622 is decreased. The piston 618 moves toward the right in response to the increase in the $P_1-P_S$ pressure differential thereacross causing an increase in the effective flow area of the axial slots 632 in the metering valve 616 and a correspondingly greater flow of fuel through orifice 608 into chamber 610. Movement of piston 618 is transmitted through spring 646 to the lever 638 in opposition to the force of bellows 634 and trim spring 644 to cause a stabilization of lever 638 and flapper valve 628. The $P_1-P_A$ pressure differential across the orifice 608 decreases and causes the piston 706 to move upward rotating lever 702 clockwise which in turn moves flapper valve 698 toward valve seat 700 causing an increase in pressure $P_S$ in chamber 688. The $P_1-P_S$ pressure differential across the piston 684 increases and actuates the piston toward the left to increase the effective flow area of the axial slots 722 in the throttling valve 678 which increases the area of the orifice 612 causing a drop in the pressure $P_A$ in chamber 610 and a corresponding increase in the flow of fuel to the afterburner fuel manifold 24. Upon reaching the predetermined constant $P_1-P_A$ pressure drop across the metering valve 616 the piston 684 is stabilized and the pressure $P_S$ in chamber 688 is maintained at the required value by the flapper valve 698.

The position of the needle valve 664 and thus the area ratio of orifices 652 and 654 will vary as a function of throttle lever 69 position and a corresponding modulated compressor discharge pressure $P_m$ will be established for each area ratio. At a given throttle lever 69 position the area ratio of orifices 652 and 654 is fixed and the modulated compressor discharge pressure $P_m$ will vary as a function of compressor discharge pressure $P_c$. Thus, it is seen that the afterburner fuel flow is controlled in accordance with the modulated compressor discharge pressure $P_m$ which varies as a function of throttle lever 69 position and/or compressor discharge pressure $P_c$.

Emergency operation of the main fuel control 44 is established automatically as a result of a power failure in the electrical system or manually, in the event of a failure of any component device in the hydro-mechanical system, by the opening of conventional switch means (not shown) on the operator's control panel. In either case, the solenoid 324 is de-energized to transfer to emergency operation. To illustrate the operation of the emergency system, it will be assumed that the manually operated switch is positioned to emergency operation. De-energization of the solenoid 324 causes the solenoid plunger to be retracted away from the lever 328 whereupon the lever 328 rotates clockwise in response to the load applied thereto by the bellows 366 and the flapper valve 332 moves away from valve seat 334. The pressure $P_S$ in chamber 344 escapes through passage 336 and valve seat 334 to drain pressure $P_0$ and the resulting $P_{SR}-P_S$ pressure differential which occurs across the piston 340 causes the piston 340 and the piston 358 to which the piston 340 is attached to move toward the right. The aforementioned predetermined degree of lost motion through which the piston 358 goes before contacting sleeve member 354 is provided to insure positive translation of the metering valve to emergency operation in the event that the metering port 124 is at its maximum opening at the time of transfer. The stem 341 engages the lever 218 and rotates the lever clockwise in response to which the follower member 226 is lifted away from the surface of the cam member 224 and the flapper valve 202 is seated against tubular member 206. The pressure $P_S$ in chamber 200 increases and drives the piston 198 and metering valve 116 toward the right whereupon communication between metering valve ports 124 and sleeve ports 126 is interrupted and communication between metering valve port 122 and sleeve ports 126 is established. Stabilization of piston 340 occurs subsequent to engagement of piston 358 with sleeve member 354 at which time the force tending to drive the piston 340 toward the right is balanced by the spring 360 load applied against sleeve member 354. A reverse sequence of events will occur when the solenoid 324 is energized in response to which the metering valve 116 will revert back to normal operation.

During emergency operation, the metering valve position is adjusted to compensate for changes in the compressor inlet pressure which arise as a result of altitude variations and/or flight speed. In response to a decrease in inlet pressure, i.e., as a result of climbing from one altitude to a higher altitude, the bellows 366 expands and rotates lever 328 in a counterclockwise direction. The flapper valve 332 is repositioned accordingly causing an increase in pressure $P_S$ in chamber 344 whereupon the piston 340 is displaced toward the left until the force applied against piston 340 is balanced by the spring 342 force applied against sleeve member 354. The lever 218 and flapper valve 203 follow the movement of piston 340 and the chamber 200 pressure $P_S$ is adjusted in a decreasing sense whereupon the metering valve 116 is actuated toward the left to decrease the effective area of the main metering port 120 and reduce fuel flow to the engine. Conversely, an increase in compressor inlet pressure results in movement of the metering valve 116 in the opposite direction such that the area of the metering port 120 is increased accordingly to supply more fuel to the engine.

It will be apparent to one skilled in the art that various modifications and changes in the form and relative arrangement of parts may be made to suit requirements without departing from the spirit of the invention. The mechanical features of the component devices which make up the fuel system have not been described in great detail and it is obvious that ordinary engineering skill and technique may be utilized to provide access means for removing and replacing parts within the various casings or for making adjustments and the like to the mechanisms. Conventional fluid seals may be used where required to seal one fluid pressure from another.

What is claimed is:

1. In a fuel system for a gas turbine engine having a burner and a throttle lever for controlling the operation of the engine, the combination of a fuel pump, a conduit for supplying pressurized fuel from said pump to said burner, a restriction in said conduit in flow controlling relationship therewith, valve means actuable as a function of the position of said throttle lever operatively connected to said restriction for controlling the fuel flow through said conduit, said valve means having first and second ports formed therein and being actuable over a first range of positions wherein said restriction and said first port coact to vary the effective flow area of said conduit independently of the position of said second port to provide a predetermined normal fuel flow schedule to said burner and being actuable over a second range of positions wherein said restriction and said second port coact to vary the effective flow area of said conduit independently of the position of said first port to provide a predetermined emergency fuel flow schedule to said burner, said valve means being actuated in said first and second ranges of positions as a function of the position of said throttle lever, and control means for actuating said valve means from said first position to said second position.

2. In a fuel system for a gas turbine engine having a burner and a throttle lever for controlling the operation of the engine, the combination of a fuel pump, a conduit for supplying pressurized fuel from said pump to said burner, a restriction in said conduit in flow controlling relationship therewith, axially and rotatably movable valve means operatively connected to said restriction for controlling the fuel flow therethrough, said valve means having an operable connection with said throttle lever and being axially and rotatably positioned as a function of the position of said throttle lever, said valve means having a first range of axial positions in relation to said restriction whereby the effective flow area of said restriction is varied in accordance with axial movement of said valve means as a function of the throttle lever position to provide a predetermined normal fuel flow schedule to said burner and a second range of axial positions whereby the effective flow area of said restriction is varied in accordance with rotational movement of said valve means as a function of the throttle lever position to provide a predetermined emergency fuel flow schedule to said burner, and means operable on demand for actuating said valve means axially from said first range of positions to said second range of positions.

3. In a fuel system for a gas turbine engine having a burner and a throttle lever for controlling the operation of the engine, the combination of a fuel pump, fluid operated means connected to drive said pump, a source of pressurized fluid associated with said engine, passage means connected to said source and said fluid operated means for delivering said pressurized fluid to said fluid operated means to drive the same, a conduit for supplying pressurized fuel from said pump to said burner, first valve means operatively connected to said conduit and to said throttle lever for controlling the rate of fuel flow therethrough to said burner as a function of the position of said throttle lever, second valve means operative with said conduit in series flow relationship with said first valve means, control means operatively connected to said passage means for controlling the flow of pressurized fluid to said fluid operated means, pressure responsive means operatively connected to said second valve means and to said conduit, said pressure responsive means being responsive to the pressure drop across said first valve means and being actuable to vary the position of said second valve means in said conduit to maintain the pressure drop across said first valve means at a predetermined constant value, said control means being connected to said conduit and responsive to the pressure drop across said first and second valve means to regulate the speed of said fuel pump in accordance with said variations in the pressure drop across said first and second valve means.

4. In a fuel system for a gas turbine engine having a compressor, a burner to which air is supplied by said compressor, and a throttle lever for controlling the operation of the engine, the combination of at least one fuel pump, a conduit for supplying pressurized fuel from said fuel pump to said burner, a restriction in said conduit in flow controlling relationship therewith, a valve member operative with said restriction for controlling the fuel flow through said conduit to said burner, normal and emergency flow ports in said valve member in series flow relationship with said restriction, said valve member being operable over a first and a second range of positions with said emergency restriction being inoperative over said first range of positions and said normal restriction being inoperative over said second range of positions, said valve member being operatively connected to said throttle lever and being rotatably positioned as a function of throttle lever position, control means operatively connected to said conduit and responsive to the pressure drop across said valve member for maintaining the pressure drop at a predetermined constant value, means responsive to the discharge pressure of said compressor operatively connected to said valve member for controlling the axial position of said valve member over said first range of positions as a function of said discharge pressure, and means operatively connected to said valve means for switching said valve means selectively between said first and second range of positions.

5. A control device for initiating a transfer from a primary fuel system to an emergency fuel system comprising means defining a passage for delivering fuel from a pump to a receiver, a restriction in said passage, valve means for controlling the fuel flow through said restriction, said valve means including normal and emergency flow channels and being operative over first and second ranges of positions, said normal and said emergency channels being operatively connected to said restriction and in series flow relationship therewith, means operatively connected to said valve means for controlling the position of said valve means throughout said first and second ranges of positions, and control means operatively connected to said valve means for actuating said valve means from said first range of positions wherein said normal flow channel and said restriction coact to control fuel flow in accordance with a normal fuel flow schedule to said second range of positions wherein said emergency flow channel and said restriction coact to control fuel flow in accordance with an emergency fuel flow schedule.

6. A control device for regulating the supply of fuel from a fuel pump to a combustion engine having a compressor comprising, in combination, first means defining a fuel passage for delivering fuel from said pump to said engine, a restriction in the fuel passage in flow controlling relationship therewith, rotatably and axially movable valve means for controlling the effective area of said restriction, said valve means including a plurality of ports in spaced relationship with one another and in series flow relationship with said restriction, said valve means having a first range of axial positions over which one of said plurality of ports coact with said restriction to vary the fuel flow to the engine in accordance with a predetermined normal fuel flow schedule, and a second range of axial positions over which another of said plurality of ports coacts with said restriction to vary fuel flow to the engine in accordance with a predetermined emergency fuel flow schedule, second means responsive to a plurality of engine control functions, third means operatively connected to said second means and said valve means for controlling the operation of said valve means over said first range of axial positions in accordance with said engine control functions, transfer means operatively connected to said third means for overriding said second means to effect a shift of said valve means to a position within said second range, fourth means responsive to an engine control function for controlling the operation of said valve means in said second range, and control means for selectively bringing said transfer means into operation.

7. In a control device as claimed in claim 6 wherein said third means includes a rotatably and axially movable cam member, a servo system actuable in response to a control signal, and a follower member operatively connected to said cam member for varying the control signal in accordance with the position of said cam member, said cam member being rotatably positioned as a function of temperature and speed conditions of the engine and axially positioned as a function of compressor discharge pressure.

8. A control device as claimed in claim 6 wherein said fourth means includes apparatus operatively connected to said valve means and responsive to compressor inlet pressure for controlling the axial position of said valve means.

9. A control device as claimed in claim 6 wherein said valve means is operatively connected to a throttle lever and rotatably positioned as a function of the position of said throttle lever.

10. A fuel system for a gas turbine engine having associated therewith a burner and a throttle lever, comprising a variable speed fluid operated motor operatively connected to a source of pressurized fluid, a fuel pump connected to and driven by said fluid operated motor, a fuel conduit for delivering fuel from said fuel pump to said burner, first means operatively connected to said throttle lever and said conduit for controlling the fuel flow through said conduit as a function of throttle lever position including a restriction in series with said conduit, a rotatably and axially movable valve member provided with two spaced apart valve ports, said valve member being operative over a first range of axial positions wherein one of said ports coacts with said restriction to provide a normal fuel flow schedule and a second range of axial positions wherein the other of said ports coacts with said restriction to provide an emergency fuel flow schedule, means operable on demand operatively connected to said rotatably and axially movable valve member for actuating the same from said first range of positions to said second range of positions, second means responsive to the pressure drop across said first means and effective to maintain said pressure drop at a predetermined constant value, said second means including valve means connected to said fuel conduit downstream from said first means for varying the rate of fuel flow through said conduit, and control means responsive to the pressure drop across both said first means and said valve means operatively connected to said fluid operated motor, said control means being operable to vary the flow of pressurized fluid to said fluid operated motor which, in turn, causes a corresponding variation in the speed of said motor and thus the speed and discharge rate of said fuel pump whereby the pressure drop across said first means and said valve means is maintained at a predetermined value.

11. In a fuel system for a gas turbine engine having a burner and independently rotating low and high pressure compressors, the combination of an air operated motor operatively connected to a source of pressurized air, a fuel pump operatively connected to and driven by said air operated motor, a conduit for delivering fuel from said pump to said burner, a restriction in the conduit in flow controlling relationship therewith, normal and emergency fuel flow regulating means operatively connected to said restriction for varying the effective flow area thereof, first control means operatively connected to said regulating means and responsive to a plurality of engine control functions for controlling the position of said normal regulating means, valve means operative with said conduit for controlling the fuel pressure in said conduit downstream from said restriction, second control means responsive to the pressure drop across said restriction for controlling the operation of said valve means such that a predetermined constant pressure drop is maintained across said restriction, first means responsive to the speed of the low pressure compressor, second means responsive to the speed of said high pressure compressor, said first and second means having connections with said second control means whereby said predetermined constant pressure drop is modified when either said low pressure compressor or said high pressure compressor exceeds a predetermined maximum allowable speed, and means responsive to the pressure drop across said restriction and said valve means for controlling the flow of pressurized air to said air operated motor and thus the discharge rate of said fuel pump to maintain the pressure drop at a predetermined value.

12. A fuel system as claimed in claim 11 wherein said first control means is responsive to low pressure compressor inlet temperature and pressure.

13. A fuel system as claimed in claim 11 wherein said first control means is responsive to low pressure compressor inlet temperature and pressure and high pressure compressor discharge pressure.

14. In a fuel system for a gas turbine engine having a burner; the combination of a variable output fuel pump a variable speed fluid operated motor connected to drive said pump; a conduit for delivering fuel from the fuel pump to said burner; a restriction in the conduit in flow controlling relationship therewith; valve means operatively connected to said restriction for varying the effective flow area thereof, said valve means including a rotatable and axially movable cylindrical valve member having spaced apart normal and emergency flow ports formed in the wall thereof in parallel flow relationship, said normal flow port coacting with said restriction to vary the effective flow area thereof as a function of the axial position of said valve member to provide a predetermined normal fuel flow schedule, said emergency flow port coacting with said restriction to vary the effective flow area thereof as a function of the rotary and axial positions of said valve member to provide a predetermined emergency fuel flow scheduled; control means responsive to a plurality of engine control functions for varying the position of said valve means; control means operatively connected to said conduit for regulating the fuel pressure in said conduit to maintain a predetermined constant pressure drop across said valve means; a fluid connection between said fluid operated motor and a source of pressurized air; valve means operative with said fluid connection for regulating the flow of air to said fluid operated motor; and control means responsive to the pressure drop across said first named valve means and said second named control means for controlling the operation of said second named valve means.

15. In a fuel system for a gas turbine engine having a burner; the combination of an air turbine driven fuel pump; a conduit for delivering fuel from the outlet of said fuel pump to said burner; valve means operatively connected to said conduit for controlling the flow of fuel therethrough to said burner; first control means responsive to a plurality of engine control functions for varying the effective area of said valve means in said conduit to provide a first predetermined fuel flow schedule; second control means responsive to a plurality of engine control functions for varying the effective area of said valve means in said conduit to provide a second predetermined fuel flow schedule; air passage means for delivering air from a source of pressurized air to the air turbine which drives said fuel pump; third control means operatively connected to said air passage means and responsive to the pressure drop across said valve means for controlling the airflow to said air turbine and thus the fuel discharge rate of said fuel pump to maintain the pressure drop across said valve means at a predetermined value; and selectively operated means operatively connected to said first and second control means for overriding said first control means or said second control means to effect a shift from said first predetermined fuel flow schedule to said second predetermined fuel flow schedule or vice versa.

16. In a fuel system for a gas turbine engine having first and second independently rotating compressors which are driven by independently rotating first and second gas turbines, respectively, a main combustion chamber to which air is supplied by said first and second compressors and to which fuel is supplied, said air and fuel being mixed and burned to provide hot motive gas which drives said first and second gas turbines, a tailpipe and an adjustable nozzle for varying the area of the tailpipe; the combination of a fuel pump for pumping full at a variable rate; variable speed means operatively connected to said fuel pump for driving the same at varying speeds to thereby vary the rate at which said fuel is pumped; a conduit for delivering fuel from said fuel pump to said main combustion chamber; a restriction in said conduit in flow controlling relationship therewith; valve means operatively connected to said restriction for controlling the effective flow area thereof; first control means operatively connected to said conduit for maintaining a substantially constant pressure drop across said restriction; second control means operatively connected to said conduit and to said variable speed means for varying the speed of said variable speed means and thus said fuel pump such that the pressure drop across said restriction and said first control means is varied in accordance with a predetermined fuel flow schedule; first speed responsive means operatively connected to said first air compressor and to said first control means; said first control means being operative in response to a predetermined maximum allowable speed of said first compressor to modify said constant pressure drop and thus the flow of fuel through said restriction to prevent overspeeding of said first air compressor; second speed responsive means operatively connected to said second air compressor and to said first control means; said first control means being operative in response to a predetermined maximum allowable speed of said second compressor to modify said constant pressure drop and thus the flow of fuel through said restriction to prevent overspeeding of said second compressor; third control means operatively connected to said nozzle and to said second speed responsive means for varying the area of the nozzle as a function of the speed of said second air compressor; and means for controlling the operation of said valve means in accordance with a plurality of engine control functions.

17. In a fuel system for a gas turbine engine having an air compressor, a main combustion chamber to which air is supplied by said compressor, a tailpipe and an adjustable nozzle for varying the area of the tailpipe: the combination of a fuel pump; a conduit for delivering fuel from said fuel pump to said main combustion chamber; a restriction in said conduit in flow controlling relationship therewith; axially movable valve means operatively connected to said restriction for controlling the effective flow area thereof, said valve means being provided with spaced apart first and second flow ports, said valve means being operative over a first range of axial positions wherein said first flow port coacts with said restriction to establish a normal fuel flow schedule and a second range of axial positions wherein said second flow port coacts with said restriction to establish an emergency fuel flow schedule; means for controlling the operation of said valve means over said first range of axial positions in accordance with a plurality of engine control functions; means for controlling the operation of said valve means over said second range of axial positions in accordance with at least one engine control function independently of said last named means first control means operatively connected to said conduit for maintaining a substantially constant pressure drop across said restriction; second control means operatively connected to said conduit and to said fuel pump for varying the speed of said fuel pump such that the pressure drop across said restriction and said first control means is varied in accordance with a predetermined fuel flow schedule; speed responsive means operatively connected to said compressor and to said first control means; said first control means being operative in response to a predetermined maximum allowable speed of said compressor to modify said constant pressure drop to prevent overspeeding of said air compressor; and third control means operatively connected to said nozzle and to said speed responsive means for varying the area of the nozzle as a function of the speed of said compressor.

18. In a fuel system for a gas turbine engine having a burner and a compressor arranged to deliver air to the burner; the combination of a centrifugal fuel pump; fluid operated means connected to drive said fuel pump; a conduit for delivering fuel from said fuel pump to said burner; passage means connected to said fluid operated means and to said compressor for supplying pressurized fluid to drive said fluid operated means; fuel flow regulating means operative with said conduit for varying the flow of fuel through the conduit to the burners; control means responsive to a plurality of engine control functions; second means operatively connected to said control means and to said fuel flow regulating means for varying the flow of fuel to said burners in accordance with said control functions said second means including means responsive to compressor inlet pressure, means responsive to compressor discharge pressure and selectively operated means operatively connected to said first and second named pressure responsive means for disabling said first named pressure responsive means or said second named pressure responsive means to provide normal and emergency fuel flow schedules, respectively; control means operatively connected to said passage means for varying the supply of pressurized fluid to said fluid operated means, said last named control means having fluid connections with said conduit and being responsive to the pressure drop across said fuel flow regulating means, said fuel pump control means being operable to regulate the discharge rate of said fuel pump to maintain the pressure drop across said fuel flow regulating means at a predetermined value.

19. In a fuel system for a gas turbine engine having a burner; a compressor for supplying pressurized air to said burner; a tailpipe; an afterburner in the tailpipe and a throttle lever; the combination of an air turbine driven fuel pump; passage means for supplying pressurized air from a source to said air turbine; a conduit for delivering fuel from said fuel pump to said burner; a branch conduit for delivering fuel from said fuel pump to said afterburner; fuel regulating means operative with said conduit for regulating the flow of fuel therethrough to said burner; second fuel regulating means operatively connected with said branch conduit for regulating the flow of fuel therethrough to said afterburner; said fuel regulating means being operatively connected to and actuable as a function of the position of said throttle lever; means responsive to compressor discharge pressure for controlling the operation of said fuel regulating means; means responsive to compressor discharge pressure for controlling the operation of said second fuel regulating means; valve means operatively connected with said conduit for controlling the flow of fuel through said conduit to maintain a substantially constant pressure drop across said fuel regulating means; and means operatively connected to said passage means for controlling the airflow to said fuel pump, said last named means including pressure responsive means; a fluid connection between said pressure responsive means and said conduit upstream from said first fuel regulating means, a fluid connection between said pressure responsive means and said conduit downstream from said valve means, and air valve means operative with said pressure responsive means and said passage means for adjusting the supply of air to said air turbine and thus the speed of said fuel pump to maintain the pressure drop between said first named and second named fluid connections at a predetermined value.

20. In a fuel system for use with a combustion engine having a burner and a throttle lever for controlling the operation of the engine; the combination of a fuel conduit connected between a source of fuel and said burner; a fuel pump operatively connected to said fuel conduit for pressurizing the fuel in said fuel conduit; fluid operated means operatively connected to said fuel pump for driving the same; a conduit connected to a source of pressurized fluid and to said fluid operated means; control means operatively connected to said conduit for controlling the flow of pressurized fluid therethrough; a first restriction in said fuel conduit in flow controlling relationship therewith; a second restriction in said fuel conduit in series with said first restriction; first valve means operatively connected to said first restriction and to said throttle lever for controlling the effective flow area of said first restriction as a function of the position of said throttle lever; second valve means operatively connected to said first restriction and to said throttle lever for controlling the effective flow area of said first restriction as a function of the position of said throttle lever, said first valve means and said second valve means being actuable over a first range of positions wherein the effective flow area of said fuel conduit is defined by said first restriction and said first valve means and actuable over a second range of positions wherein the effective flow area of said fuel conduit is defined by said first restriction and said second valve means, transfer means operatively connected to said first and said second valve means for switching said first and second valve means between said first and second ranges of positions; and third means operatively connected to said second restriction and responsive to the pressure drop across said first restriction for varying the effective flow area of said second restriction to maintain said pressure drop at a predetermined constant value.

21. In a fuel system for use with a combustion engine having a burner and a throttle lever for controlling the operation of the engine; the combination of a fuel conduit connected between a source of fuel and said burner; a fuel pump operatively connected to said fuel conduit for pressurizing the fuel in said fuel conduit; fluid operated means operatively connected to said fuel pump for driving the same; a conduit connected to a source of pressurized fluid and to said fluid operated means; control means operatively connected to said conduit for controlling the flow of pressurized fluid therethrough; a first restriction in said fuel conduit in flow controlling relationship therewith; a second restriction in said fuel conduit in series with said first restriction; first valve means operatively connected to said first restriction and to said throttle lever for controlling the effective flow area of said first restriction as a function of the position of said throttle lever; second valve means operatively connected to said first restriction and to said throttle lever for controlling the effective flow area of said first restriction as a function of the position of said throttle lever, said first valve means and said second valve means being actuable over a first range of positions wherein the effective flow area of said fuel conduit is defined by said first restriction and said first valve means and actuable over a second range of positions wherein the effective flow area of said fuel conduit is defined by said first restriction and said second valve means, transfer means operatively connected to said first and said second valve means for switching said first and second valve means between said first and second ranges of positions; an always open passage connected to said fuel conduit in parallel flow relationship with said first restriction for supplying fuel in accordance with minimum fuel requirements of the engine when said first restriction is closed, and third means operatively connected to said second restriction and responsive to the pressure drop across said first restriction for varying the effective flow area of said second restriction to maintain said pressure drop at a predetermined constant value.

22. In a fuel control system for a gas turbine engine having an air inlet, a low pressure compressor and a high pressure compressor in series flow with said inlet, said compressors being drivably connected to separate turbines and arranged to rotate independently of each other, a combustion chamber, an afterburner downstream from asid turbines and an adjustable nozzle for varying the area of the discharge end of the engine; the combination of a source of fuel; a conduit connected between said combustion chamber and said source of fuel; a branch conduit connected between said conduit and said afterburner; fuel pressurizing means in said conduit for pressurizing the fuel in said conduit and said branch conduit; an air turbine operatively connected to said fuel pressurizing means for driving the same; a conduit connecting said air turbine with a source of pressurized fluid; a main fuel control operatively connected to said conduit in which a first valve is arranged to vary the effective area of said conduit as a function of the position of a throttle lever, and a second valve is arranged to control the fuel flow through said conduit such that a predetermined constant pressure differential is maintained across said first valve, control means for varying the flow of pressurized air through said second named conduit in accordance with a sensed pressure differential across said main fuel control, first means responsive to the speed of said low pressure compressor; second means responsive to the speed of said high pressure compressor; said first and second means having operable connections with said second valve and being arranged to actuate said second valve to modify said predetermined constant pressure differential to prevent overspeeding of either of said compressors; an afterburner fuel control operable in response to movement of said throttle lever for controlling the fuel flow through said branch conduit; and nozzle area control means operably connected to said second means for varying the area as a function of the speed of said high pressure compressor.

23. In a fuel system for a combustion engine having an air inlet, an air compressor and a burner in series flow with the air inlet and a throttle lever for controlling the operation of the engine; the combination of a fuel pump; a fuel conduit for supplying fuel from said pump to said burner; a restriction in said conduit in flow controlling relationship therewith; valve means operatively connected to said throttle lever and said restriction for controlling the effective area of said restriction as a function of the position of said throttle lever, said valve means including first and second ports arranged in spaced apart relationship; first control means operatively connected to said valve means for controlling the position of said valve means over a first range of positions wherein said first port and said restriction coact to control the flow of fuel through said conduit; second control means operatively connected to said valve means for controlling the position of said valve means over a second range of positions wherein said second port and said restriction coact to control the flow of fuel through said conduit; and switching means operative with said second control means and selectively operated for actuating said valve means to a position in said first or said second range of positions; said first control means being rendered inoperative over said second range of positions and said second control means being rendered inoperative over said first range of positions.

24. In a fuel system for a combustion engine equipped with a burner and a compressor for supplying pressurized air to the burner; the combination of a source of fuel; a conduit for supplying fuel from said source to said burner; a fuel pump for pressurizing the fuel in said conduit; valve means operatively connected to said conduit for controlling the fuel flow therethrough; control means operatively connected to said valve means and responsive to a plurality of engine control functions for controlling the position of said valve means; a valve member operatively connected to said conduit downstream from said valve means for controlling the fuel pressure downstream from said valve means and thus the pressure drop across said valve means; pressure responsive means responsive to the pressures upstream and downstream from said valve means; said pressure responsive means being operatively connected to said valve member and operating to position said valve member to maintain said pressure drop at a predetermined constant value; and speed responsive means operatively connected to said compressor and said pressure responsive means; said speed responsive means operating in response to a maximum allowable speed to modify one of the pressures to which said pressure responsive means responds such that said predetermined constant pressure drop is modified to cause a decrease in the fuel flow to the burners to prevent overspeeding of said compressor, said speed responsive means including a normally closed valve member having a fluid connection with said one of the pressures and compressor speed actuated means operatively connected to said normally closed valve member for biasing said normally closed valve member to an open position in response to said maximum allowable speed.

25. In a fuel system for a combustion engine having a burner: the combination of a fuel pump; a fluid driven turbine operatively connected to said fuel pump for driving the same; a conduit for supplying pressurized fuel from said fuel pump to said burner; a restriction in said conduit; fuel flow control means operatively connected to said restriction for controlling the fuel flow through said conduit; a conduit operatively connected to said fluid driven turbine and a source of pressurized fluid for supplying fluid to drive said turbine; and control means responsive to the pressure drop across said fuel flow control means operatively connected to said second named conduit for varying the flow of pressurized fluid to said turbine; said fuel flow control means including a valve member, first and second flow ports in said valve member in spaced relationship with one another; said valve member being operable over a first range of positions whereby said first flow port coacts with said restriction to control the flow of fuel through said first named conduit in accordance with a predetermined normal fuel flow schedule and being operable over a second range of positions whereby said second restriction flow port coacts with said restriction to control the flow of fuel through said first named conduit in accordance with a predetermined emergency fuel flow schedule, and means automatically operative in response to a first input signal for actuating said valve member from one range of positions to the other and to a second input signal representative of a condition of engine operative for actuating said valve members in said first and second ranges of positions.

26. In a fuel system for a combustion engine having a burner to which fuel is supplied by a supply conduit; the combination of first means operatively connected to said supply conduit for controlling the fuel flow therethrough in accordance with a predetermined fuel flow schedule; second means operatively connected to said conduit for controlling the pressure drop across said first means at a predetermined constant value; control means responsive to the speed of said engine operatively connected to said second means, said second means including a first fluid connection with the upstream side of said first means and a second fluid connection with the downstream side of said first means and a member responsive to the pressure drop between said fluid connections, said control means including a passage connecting said second fluid connection with a source of drain pressure; normally closed valve means operatively connected to said passage for controlling the flow therethrough and means driven by said engine operatively connected to said valve means for opening said valve means at a predetermined maximum allowable engine speed whereupon said predetermined constant pressure drop is modified to cause a reduction in fuel flow to the burner to prevent overspeeding of said engine.

References Cited in the file of this patent

UNITED STATES PATENTS

| | | |
|---|---|---|
| 1,485,264 | Heald | Feb. 26, 1924 |
| 2,141,428 | Carroll | Dec. 27, 1938 |
| 2,670,599 | Davies et al. | Mar. 2, 1954 |
| 2,674,847 | Davies et al. | Apr. 13, 1954 |
| 2,688,841 | Decher et al. | Sept. 14, 1954 |
| 2,788,063 | Wright | Apr. 9, 1957 |
| 2,807,138 | Torell | Sept. 24, 1957 |
| 2,823,517 | Blanc | Feb. 18, 1958 |
| 2,856,754 | Torell | Oct. 21, 1958 |

FOREIGN PATENTS

| | | |
|---|---|---|
| 1,098,147 | France | Mar. 2, 1955 |

UNITED STATES PATENT OFFICE
CERTIFICATE OF CORRECTION

Patent No. 3,023,575                                March 6, 1962

Elmer A. Haase et al.

It is hereby certified that error appears in the above numbered patent requiring correction and that the said Letters Patent should read as corrected below.

Column 2, line 36, for "until" read -- unit --; column 5, line 38, for "estabilshed" read -- established --; column 12, line 35, for "regulator" read -- regulate --; column 24, line 65, for "asid" read -- said --.

Signed and sealed this 31st day of July 1962.

(SEAL)
Attest:

ERNEST W. SWIDER
Attesting Officer

DAVID L. LADD
Commissioner of Patents